July 6, 1965     C. B. ZIMMERMAN     3,192,815
WORK TABLE FOR STATIONARY POWER-OPERATED MACHINE
Filed June 4, 1963
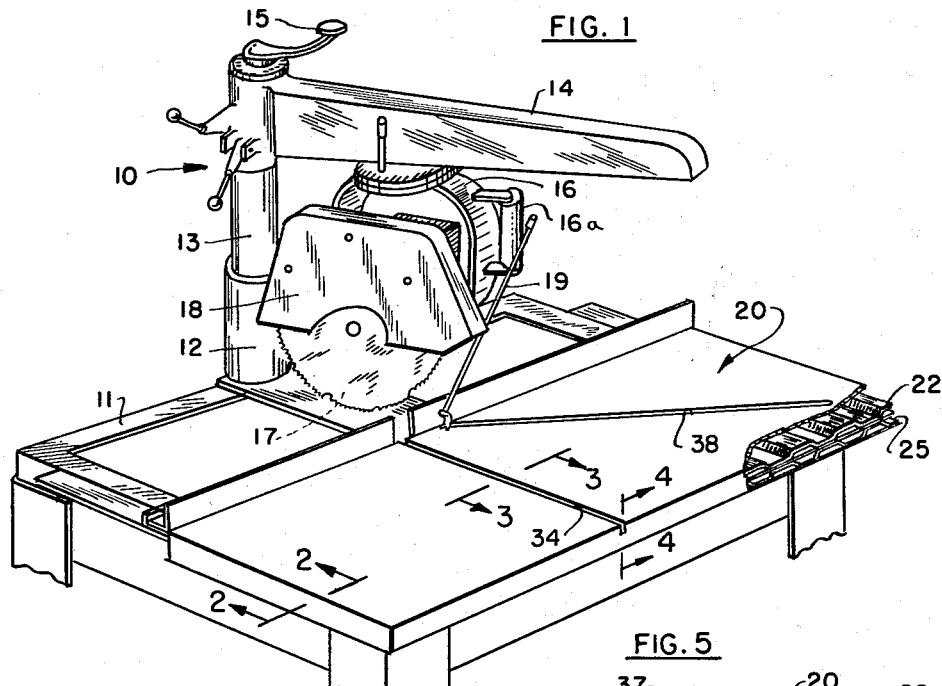
FIG. 1
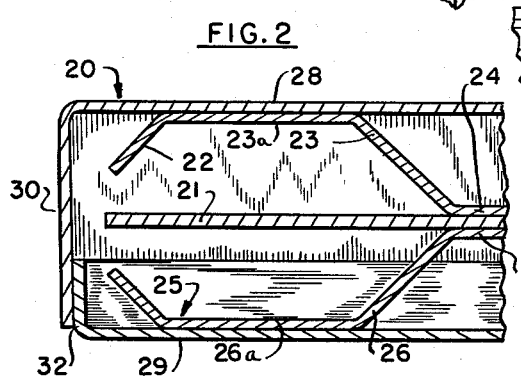
FIG. 2
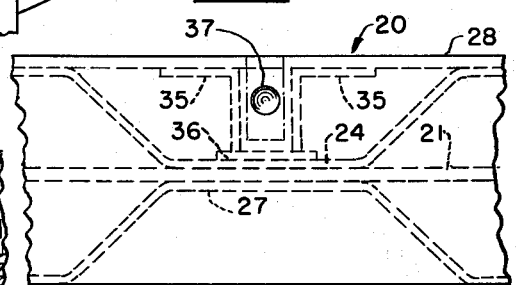
FIG. 5
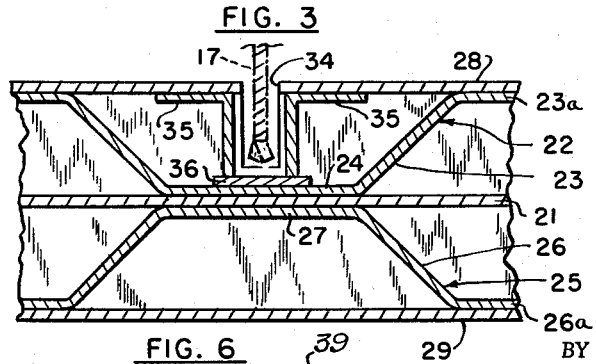
FIG. 3
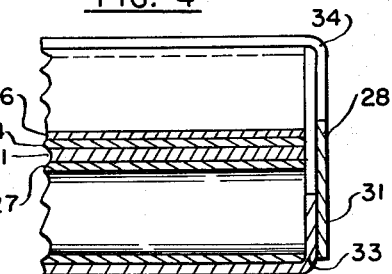
FIG. 4
FIG. 6
INVENTOR
CHRISTIAN B. ZIMMERMAN
BY
*Leonard Bloom*
ATTORNEY

United States Patent Office 3,192,815
Patented July 6, 1965

3,192,815
WORK TABLE FOR STATIONARY POWER-OPERATED MACHINE
Christian B. Zimmerman, Lancaster, Pa., assignor, by mesne assignments, to The Black and Decker Manufacturing Company, Towson, Md., a corporation of Maryland
Filed June 4, 1963, Ser. No. 285,294
3 Claims. (Cl. 83—471)

The present invention relates to a fabricated work table for a stationary machine having a power-operated cutting tool supported from a radial arm, and more particularly, to a composite corrugated-aluminum work table for a radial arm saw machine utilized for metal-cutting purposes.

The radial arm saw machine is a very versatile piece of shop equipment and can be used for a variety of purposes, such as cutting-off all types of wood, metals, plastics and other materials. In the use of the machine as a cut-off saw, a saw carriage is traversed along the stationary radial arm; and the saw carriage is provided with a power-operated circular saw blade, which, while cutting through the workpiece, is adapted to project partially within a kerf previously formed to a desired depth in the work table. In the prior art, the work table has usually been made of wood or a fibrous type of material, such that the blade itself can cut the desired kerf in the work table. When the radial arm saw machine is used for metal-cutting purposes, however, the peripheral portion of the blade must extend considerably below the top surface of the work table; otherwise, a frictional "drag" will develop which results in a jagged or rough cut. Consequently, for metal cutting operations, the kerf in the work table should be formed to a greater depth than that which would ordinarily be required for cutting other materials; and thus for reasons of strength as well as economy, the wooden work table heretofore used in the prior art is generally unsatisfactory. Besides, for metal-cutting operations, the circular blade is usually provided with a suitable coolant in the form of a mist or fluid, and the use of such coolants is generally not compatible with a work table made from a woodfiber material. On the other hand, if the work table were made of a solid piece of metal, such as aluminum, then it must be sufficiently thick to provide adequate strength and stability against warpage after one or more kerfs are cut into it; and thus for reasons of economy of manufacture, the use of a solid metal work table is generally precluded.

Accordingly, it is an object of the present invention to alleviate the aforementioned deficiencies of the prior art by providing a composite aluminum work table fabricated from one or more corrugated sheets having a series of longitudinal substantially-uniform flutes.

It is another object of the present invention to provide, for use in conjunction with a radial arm saw machine adaptable for metal-cutting applications, a fabricated work table which is sufficiently rigid and stable, has an attractive appearance, and is quite economical and convenient to manufacture.

It is still another object of the present invention to provide a work table having a cellular structure, which, while maintaining good structural strength, allows the blade to extend to a depth of approximately 40% of the thickness of the work table.

It is yet still another object of the present invention to provide a composite work table which combines maximum strength and minimum weight with minimum cost of materials.

In accordance with the general teachings of the present invention, there is herein illustrated and described a work table comprising at least one corrugated sheet having a series of longitudinal flutes. A plate is secured on top of the sheet, and a longitudinal kerf is formed in the plate between an adjacent two of the longitudinal flutes. This kerf is substantially parallel to the pair of adjacent flutes, such that the saw blade may project through the kerf intermediately of the adjacent flutes and to a depth which approaches the thickness of the corrugated sheet.

In accordance with the more specific teachings of the present invention, there is herein illustrated and described for use in conjunction with a radial arm saw machine adapted for metal cutting operations, a composite work table comprising a center plate and a first corrugated sheet secured on top of the center plate, the corrugated sheet having a series of substantially-uniform longitudinal flutes. A second corrugated sheet, preferably being substantially-identical to the first corrugated sheet and also having a series of substantially-uniform longitudinal flutes, is secured on the bottom of the center plate with its flutes being substantially aligned with the respective flutes of the first corrugated sheet. A top plate is secured on top of the first corrugated sheet, and a bottom plate is secured on the bottom of the second corrugated sheet. The top plate and the bottom plate each has respective flanges formed at the sides and edges thereof with the flanges being nested together to form a completely closed table. At least one longitudinal kerf is formed in the top plate between an adjacent two of the longitudinal flutes of the first corrugated sheet, such that the peripheral portion of a circular saw blade may project through the kerf intermediately of the two adjacent flutes. The depth to which the blade may project through the kerf approaches the depth of the flutes on the first corrugated sheet and is approximately forty percent of the overall thickness of the work table, which for metal-cutting operations, is quite sufficient and provides a smooth, clean cut.

These and other objects of the present invention will become apparent from a reading of the following specification, taken in conjunction with the enclosed drawings, in which:

FIGURE 1 is a perspective view of a conventional radial arm saw machine which is provided with the work table of the present invention;

FIGURE 2 is an enlarged section view taken along the lines 2—2 of FIGURE 1, showing the beginning of the longitudinal flutes of the respective corrugated sheets which are mounted on either side of a flat center plate, and further showing the manner in which the top and bottom plates nest together to form an enclosed work table;

FIGURE 3 is an enlarged section view taken along the lines 3—3 of FIGURE 1, showing the manner in which the longitudinal kerf is formed in the top plate intermediately of an adjacent pair of flutes of the first corrugated sheet, and further showing how the peripheral portion of the circular saw blade may project into the kerf between the adjacent flutes;

FIGURE 4 is an enlarged section view taken along the lines 4—4 of FIGURE 1, further showing the longitudinal kerf formed in the top plate;

FIGURE 5 is an enlarged front elevation of a fragmentary portion of the work table, showing a dimple which is formed on one of the flanges of the top plate to locate the making of the longitudinal kerf after the composite work table has been fabricated; and FIGURE 6 is an enlarged section view of the table top, showing its embossed surface.

With reference to FIGURE 1, there is illustrated a conventional radial arm saw machine 10 with which the teachings of the present invention may find more particular utility, although it will be appreciated that the teachings and essence of the present invention are not necessarily confined thereto, but rather are equally applicable to a wide variety of power-operated tools and devices. With this in mind, the radial arm saw machine 10, comprises a frame 11, a column base 12 secured to the frame, a post of column 13 supported in the column base, a stationary radial arm 14 mounted on the column 13, a crank lever 15 for raising the arm 14 to a desired height, a tool or saw carriage 16 supported from the radial arm 14 and monted on conventional tracks (not shown) in the arm, whereby the saw carriage 16 may be manually traversed along the length of the radial arm 14 by means of the handle 16a, a power-operated circular saw blade 17 (or other cutting tool) mounted on the carriage 16, a saw guard 18, an anti-kickback protective device 19, and the fabricated work table of the present invention, being generally denoted by the numeral 20.

With reference to FIGURES 1 through 5, the work table 20 includes a substantially-flat center plate 21 to which a first corrugated sheet 22 is secured. The corrugated sheet 22, which may be formed from aluminum or other suitable materials, is readily-available on the commercial market and comprises a series of substantially-uniform longitudinal flutes 23 equally-spaced with respect to each other. Preferably, but not necessarily, the first corrugated sheet 22 is bonded to the center plate 21 by means of a suitable epoxy-based adhesive material at the bases 24 of its respecitve flutes 23. A second corrugated sheet 25 is provided, corresponding substantially to the first corrugated sheet 22, and likewise has a series of substantially-uniform longitudinal flutes 26 equally-spaced with respect to each other; and its respective bases 27 are likewise bonded to the center plate 21, such that the flutes 23 and 26 of the sheets 22 and 25, respectively, are substantially aligned with each other. A top plate 28 is bonded to the first corrugated sheet 22 at various places along the portions 23a of the flutes 23. A bottom plate 29 is likewise bonded in a preferred manner to the respective portions 26a of the flutes 26. The top plate 28 has flanges 30 and 31 formed along its sides and edges, see FIGURES 2 and 4, while the bottom plate 29 likewise has respecitve flanges 32 and 33 formed along its sides and edges. The respective flanges 30, 31 of the top plate 28 are adapted to nest or overlap, see FIGURE 2, with respect to the corresponding flanges 32, 33 of the bottom plate 29, thereby providing an enclosed construction for the overall composite work table 20.

With further reference to FIGURES 1, 3, and 5, a longitudinal kerf 34 is formed in the top plate 28 after the work table 20 has been fully assembled. This may be done by a cutting operation subsequent to the assembly of the work table and its installation on the radial arm saw machine 10. The longitudinal kerf 34, see FIGURE 3, is formed in the top plate 28 between, and substantially-parallel to, an adjacent two of the longitudinal flutes 23 of the first corrugated sheet 22, such that the peripheral portion of the blade 17 may project through the kerf 34 intermediateely of the adjacent flutes 23 to a depth which approaches the depth of the flutes 23 on the first corrugated sheet 22 and to a depth which is approximately forty percent of the overall thickness of the composite work table 20. Preferably, a pair of longitudinal angle stiffeners 35, having a longitudinal bracing member 36 secured therebetween, are bonded to the underside of the top plate 28 prior to the bonding of the top plate 28 to the first corrugated sheet 22. The location of the kerf 34 in the top plate 28 is determined by means of a dimple 37, see FIGURE 5, which denotes the location in which the longitudinal kerf 34 is to be made subsequent to the overall assembly of the table 20.

Moreover, in addition to the kerf 34, one or more auxiliary kerfs 38 may be formed in the work table 20 transversely of the corrugated sheet 22, so as to facilitate the making of a miter cut.

With reference to FIGURE 6, the top plate 28 may be provided with an embossed top surface 39 so as to provide an attractive appearance and prevent the work table 20 from being scratched or otherwise marred.

The composite work table 20 of the present invention is fully-enclosed (save for the kerf 34) and combines the desirable features and advantages of low cost and ease of assembly together with high strength, good stability, and minimum weight. The corrugated sheets 22 and 25, having a wavy cross-section, facilitate a table having a cellular structure. The embossed top finish of the table renders a pleasing, attractive appearance and prevents the table from being marred or scratched.

Obviously, many modifications may be made without departing from the basic spirit of the present invention; and accordingly, within the scope of the appended claims, the invention may be practiced other than has been specifically described herein.

I claim:
1. A work table for a radial arm saw machine in which a motor-driven saw blade is traversed above the table; said work table comprising:
 (A) a corrugated sheet having a series of longitudinal flutes, said flutes being arranged substantially parallel to the direction in which the saw blade is traversed above the table;
 (B) a plate secured on top of said corrugated sheet, whereby a substantially-flat surface is provided for supporting a workpiece; and
 (C) a longitudinal kerf formed in said plate in substantial alinement with the traversing saw blade;
 (D) said longitudinal kerf being formed between an adjacent pair of said longitudinal flutes in said corrugated sheet;
 (E) whereby the saw blade projects through said longitudinal kerf between said adjacent flutes to a predetermined depth below said plate;
 (F) whereby a smaller arcuate portion of the saw blade is in engagement with the workpiece at any one time; and
 (G) whereby a frictional "drag" on the blade is precluded and a cleaner cut is obtained, especially on metal-cutting operations.

2. A work table according to claim 1, wherein:
 (A) the blade projects through said longitudinal kerf to a majority of the height of said adjacent pair of longitudinal flutes.

3. A work table according to claim 1, wherein:
 (A) a pair of longitudinal angle stiffeners are secured to the undersurface of said top plate, one on each side of said longitudinal kerf.

References Cited by the Examiner
UNITED STATES PATENTS

| | | |
|---|---|---|
| 2,042,721 | 6/36 | Loewy. |
| 2,142,303 | 1/39 | Crouch _____ 143—6.1 |
| 2,481,046 | 9/49 | Scurlock. |
| 2,823,460 | 2/58 | Weiler _____ 269—289 |
| 2,989,145 | 6/61 | Goodloe. |
| 3,013,641 | 12/61 | Compton. |

ANDREW R. JUHASZ, *Primary Examiner.*